(12) United States Patent
Soufiane

(10) Patent No.: US 7,003,984 B2
(45) Date of Patent: Feb. 28, 2006

(54) HYBRID MANUFACTURING PROCESS FOR OPTICAL FIBERS

(75) Inventor: Abdelouahed Soufiane, Boston, MA (US)

(73) Assignee: Verrillon, Inc., Boston, MA (US)

( * ) Notice: Subject to any disclaimer, the term of this patent is extended or adjusted under 35 U.S.C. 154(b) by 443 days.

(21) Appl. No.: 10/135,226

(22) Filed: Apr. 30, 2002

(65) Prior Publication Data
US 2002/0157423 A1    Oct. 31, 2002

Related U.S. Application Data

(60) Provisional application No. 60/287,505, filed on Apr. 30, 2001.

(51) Int. Cl.
*C03B 37/018* (2006.01)

(52) U.S. Cl. .......................... 65/418; 65/384; 65/390; 65/419; 65/428; 65/488; 65/494; 65/507; 65/DIG. 9

(58) Field of Classification Search ................. 65/17.2, 65/17.4, 390, 413–428, DIG. 9, 384, 488, 65/494, 507; 385/123–128, 142, 144; 427/475–481, 427/163.2; 501/50, 64, 78, 97.2, 98.2, 126
See application file for complete search history.

(56) References Cited

U.S. PATENT DOCUMENTS

| | | | | |
|---|---|---|---|---|
| 4,173,305 A | | 11/1979 | Blankenship | 239/79 |
| 4,199,335 A | * | 4/1980 | Gliemeroth et al. | 65/419 |
| 4,217,027 A | | 8/1980 | MacChesney et al. | 350/96.3 |
| 4,262,035 A | | 4/1981 | Jaeger et al. | 427/39 |
| 4,336,049 A | * | 6/1982 | Takahashi et al. | 65/390 |
| 4,378,987 A | * | 4/1983 | Miller et al. | 65/418 |
| 4,537,611 A | * | 8/1985 | Douklias et al. | 65/417 |
| 4,608,070 A | | 8/1986 | Roba | 65/3.12 |
| 4,787,927 A | | 11/1988 | Mears et al. | 65/3.12 |
| 5,123,940 A | | 6/1992 | DiGiovanni et al. | 65/3.12 |
| 5,151,117 A | | 9/1992 | Bartholomew et al. | 65/3.12 |
| 5,296,012 A | | 3/1994 | Antos et al. | 65/3.12 |
| 5,622,750 A | | 4/1997 | Kilian et al. | 427/163.2 |
| 5,711,782 A | | 1/1998 | Okamura et al. | 65/390 |
| 5,961,682 A | | 10/1999 | Lee et al. | 65/384 |
| 6,145,345 A | | 11/2000 | Marszalek et al. | 65/414 |

(Continued)

FOREIGN PATENT DOCUMENTS

EP          0 303 533 A1      2/1989

(Continued)

OTHER PUBLICATIONS

Patent Cooperation Treaty, International Search Report, International Application No. PCT/US 02/13737, mailed on Sep. 3, 2002, 7 pages.

(Continued)

*Primary Examiner*—Eric Hug
(74) *Attorney, Agent, or Firm*—Goodwin & Procter LLP

(57) ABSTRACT

A hybrid method of and apparatus for producing a structure capable of being drawn into an optical fiber. The method includes the steps of conducting vapor-phase reactants into an interior region of a glass tube, conducting aerosol form reactants into the interior of the glass tube. The tube is exposed to a heat, thereby causing a reaction among the vapor-phase and aerosol reactants. The reaction yields a product, in a solid form, within the tube. The apparatus includes a reaction tube, a vapor-phase reactant conduit, an aerosol-form conduit, and a heat source. The vapor-phase and aerosol-form reactant conduits facilitate introduction of vapor-phase and aerosol-form reactants into the reaction tube. The aerosol-form reactants are introduced proximate to a reaction zone created by the heat source. The aerosol-form reactants conduit and heat source travel the axial length of the reaction tube.

14 Claims, 4 Drawing Sheets

U.S. PATENT DOCUMENTS

| | | | |
|---|---|---|---|
| 6,161,398 A * | 12/2000 | Partus | 65/379 |
| 6,192,713 B1 | 2/2001 | Zhang et al. | 65/390 |
| 6,363,754 B1 * | 4/2002 | Choi et al. | 65/417 |
| 6,546,757 B1 * | 4/2003 | Morse | 65/377 |
| 6,578,387 B1 * | 6/2003 | Tankala | 65/390 |

FOREIGN PATENT DOCUMENTS

| | | |
|---|---|---|
| GB | 1 559 768 | 1/1980 |
| GB | 2 118 1651 | 10/1983 |
| JP | 60011241 | 1/1985 |
| WO | 83/03600 | 10/1983 |

OTHER PUBLICATIONS

Morse et al. "Aerosol Techniques for Fiber Core Doping," *IEEE*, US. vol. Conf. 14, Feb. 18-22, 1991, p. 53.

Tran et al., "Optical Glass Fibers, Apparatus and Preparation Using Reactive Vapor Transport and Deposition", United States Inventory Registration, Registration No. H1754, Published on Oct. 6, 1998, 8 pages.

* cited by examiner

HYBRID MANUFACTURING PROCESS FOR OPTICAL FIBERS

CROSS-REFERENCE TO RELATED APPLICATIONS

This application claims priority to and the benefit of U.S. Provisional Patent Application Ser. No. 60/287,505 filed on Apr. 30, 2001, the entire disclosure of which is herein incorporated by reference.

FIELD OF THE INVENTION

The invention relates to optical fiber manufacturing methods and more specifically to a hybrid manufacturing method.

BACKGROUND OF THE INVENTION

Glass optical fibers are typically manufactured from solid "preform" rods, which are essentially large-scale models of the eventual fiber. That is, the geometry of the preform—the core, the surrounding cladding and any additional internal structures—will be retained in the fiber, which is "drawn" from the preform. This is accomplished by lowering the preform into a furnace at the top of a tower. In the furnace, tightly controlled temperatures (usually approaching 2000° C.) soften the tip of the preform. Once the softening point of the preform tip is reached, gravity takes over and a molten swell of material free-falls until it has been stretched into a thin strand. The operator threads this strand of fiber through a series of coating dies and measurement stations, and the drawing process begins. The fiber, which retains the relative internal dimensions and relationships of the preform, is pulled by a capstan situated at the bottom of the draw tower and then wound on winding drums.

Optical fiber preforms are typically manufactured using one of the following processes: modified chemical vapor deposition (MCVD), outside vapor deposition (OVD), vapor axial deposition (VAD), or plasma vapor deposition (PVD). MCVD is one of the most commonly used processes. In general, MCVD involves the use of a heated glass tube that is rotated by a lathe while chemicals are conducted into the glass tube in a vapor phase.

More specifically, with reference to FIG. 1A, the MCVD process involves a glass tube 10 that is rotated by a lathe 12 at a constant rate. A torch 20 producing a flame repeatedly travels longitudinally from one end of the glass tube 10 to the other and back. A heat control unit 24 controls the temperature of the torch 20, by varying the mixture of $O_2$ and $H_2$ provided to the torch 20. As the tube 10 is rotated and heated, various chemical compounds in the vapor phase are carried by oxygen into the glass tube 10 through a gas feed pipe (conduit) 28, which is in communication with a connector 32 at one end of the glass tube 10. The compounds may be conducted from a plurality of bubblers 36a, 36b, 36c (referred to generally as bubbler 36) and can include, for example, $SiCl_4$, which is used to generate $SiO_2$, a main constituent of the optical fiber material; $GeCl_4$, used to obtain $GeO_2$ for controlling a refractive index of the fiber core or cladding; and $POCl_3$. The rates at which the compounds enter the glass tube 10 are controlled by mass flow controllers 38a, 38b, 38c, 38d (referred to generally as mass flow controller 38), each of which controls the flow of a carrier gas, for As the compounds enter the glass tube 10, they react in the interior region of the tube which is heated by the flame from the torch 20. The predominant reaction is $SiCl_4+O_2 \rightarrow SiO_2+2Cl_2$. The $SiO_2$ is deposited on the wall of the glass tube 10 in the solid phase, as soot particles, and $Cl_2$ and any unreacted compound is exhausted from the glass tube 10 in a gaseous state. Typically, as illustrated in FIG. 1B, the soot particles follow the heat gradient and deposit ahead of the flame. Layer upon layer of material is deposited within the glass tube 10 as the torch 20 successively passes over the axial length of the tube 10.

Often it is desirable to form a fiber preform with dopants other than those typically used in the MCVD process (i.e., P, Ge, B, Ti). For example, a lasing dopant (e.g., a lanthanide such as Er, Yb or Tm) may be introduced into the fiber preform. Unfortunately, lasing-dopant precursors such as Er compounds are typically used in solid form, and therefore do not lend themselves to MCVD because they do not exhibit sufficient vapor pressure. Therefore, to introduce these compounds into the depositing material within the glass tube, the soot is unsintered or only partially sintered—that is, the flame is maintained at a temperature (1100–1400° C., for example) insufficient to fully sinter the soot into glass, so that it remains porous. The tube 10 is subsequently removed from the lathe and immersed in a solution of the desired dopant. The dopant soaks into the partially sintered soot. Then, after soaking, the glass tube is placed back in the lathe, dried and reheated at a higher temperature (approximately 1800° C. is typical), thereby sintering the dopant-soaked soot particles into a doped glass preform.

The foregoing process is inconvenient and cumbersome in requiring unsintered deposition followed by soaking and then re-application of heat to sinter the dopant-containing material. Moreover, this approach may also result in uneven doping, soot inconsistencies, flaking, or cracking and consequent commercial unsuitability of at least part of the final product.

Another method for fabricating doped optical fiber preforms includes forming a glass core on the inner surface of a quartz reaction tube according to the MCVD technique. A compound of a rare earth element (i.e., a dopant) is located in a chamber formed at one end portion of the quartz reaction tube, where it is heated with a burner and sublimated. The vapor-phase reactants used to produce the core are introduced into the quartz reaction tube along with the sublimated dopant compound, thereby causing deposition of a core glass doped with the rare earth element.

Ordinarily, the vapor pressure of the rare earth element compound is sufficiently low that the compound is liable to settle out. Accordingly, the concentration of the doped rare earth element is apt to become non-uniform especially along the length of the optical fiber preform. Another limitation is the limited doping level that can be achieved. In addition, it is difficult to accurately control the concentration of the doped rare earth element.

Still another method of producing a doped optical fiber preform is described in U.S. Pat. No. 5,711,782 to Okamura et al. ("Okamura"), the entire contents of which are herein incorporated by reference. The method of Okamura involves cooling to an appropriate temperature the glass tube in which the gaseous chemicals are reacted, and moving a dopant solution feed pipe at a given speed along the length of the reaction tube while spraying an atomized dopant solution from a nozzle. The atomized dopant solution is sprayed over the porous, soot-like core glass and impregnated therein. The movement of the dopant solution feed pipe at a given speed ensures uniform impregnation of the solution along the length of the reaction tube.

After dehydration, the porous core glass is consolidated (i.e., sintered). Finally, the glass layers within the reaction tube are collapsed to obtain an optical fiber preform. The process of Okamura requires two heating steps, one to partially sinter the core and a second to fully sinter (i.e., consolidate) the core after doping.

Accordingly, there exists a need for method of fabricating a doped optical fiber preform without interrupting the MCVD process to dope the preform.

SUMMARY OF THE INVENTION

The present invention provides optical fiber preform manufacturing processes that require only a single heating step. This process combines MCVD techniques with aerosol deposition techniques, thereby removing the need for multiple processing steps. The dopants and glass-producing chemicals can be reacted and sintered in the same step.

In one aspect the invention relates to a hybrid method of producing a structure capable of being drawn into an optical fiber. In accordance with the method, vapor-phase and aerosol-form reactants are conducted into an interior region of a glass tube. The tube is exposed to a heat, thereby causing a reaction among the vapor-phase and aerosol-form reactants. The reaction yields a product, in a solid form, within the tube.

In one embodiment, the heat is supplied by a flame that moves substantially along the axial length of the tube. The flame has as envelope that defines a reaction region within the tube. The aerosol-form reactants, which may be or include a lasing material precursor, are continuously injected into the moving reaction region. The products of the reaction are deposited as soot along the interior of the tube where they are immediately sintered to form the preform.

In another aspect, the invention is directed to an apparatus for producing a structure capable of being drawn into an optical fiber. The apparatus includes a reaction tube, a vapor-phase reaction conduit, an aerosol-form reactant conduit, and a heat source. Vapor-phase reactants and aerosol-form reactants are introduced through their respective conduits into the interior of the reaction tube through an end (i.e., the same end or different ends) thereof. The aerosol-form reactant conduit moves back and forth along the axial length of the reaction tube and maintains proximate introduction of the aerosol-form reactants. The heat source (e.g., a flame having a temperature of approximately 1600° C.–1900° C.), moves axially with the aerosol-form reactants conduit, along the axial length of the tube to create a moving reaction region. In one embodiment, the aerosol-form reactants include a lasing-material precursor in a solution, for example, an Er compound.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

The present invention combines the conventional MCVD and aerosol deposition techniques. The hybrid method of the invention eliminates the removing, soaking, and reheating steps described above. Instead, the dopant is deposited by aerosol deposition, and sintered with the soot deposited by the conventional MCVD process. As a general overview, vapor-phase reactants are conducted into the interior region of a glass tube. Additional reactants are introduced into the glass tube in aerosol form, and the tube is heated to cause reaction among the aerosol-form and vapor-phase reactants. The reaction yields solid-form particles that are deposited annularly within the glass tube 10, and which are sintered in a single heating step. The additional reactants are those which are unsuitable for vapor-phase reaction because they do not have sufficient vapor pressure to be incorporated in the vapor phase (e.g., $ErCl_3$, other lasing-dopant precursors, Si, or Ge).

Figure 1A:
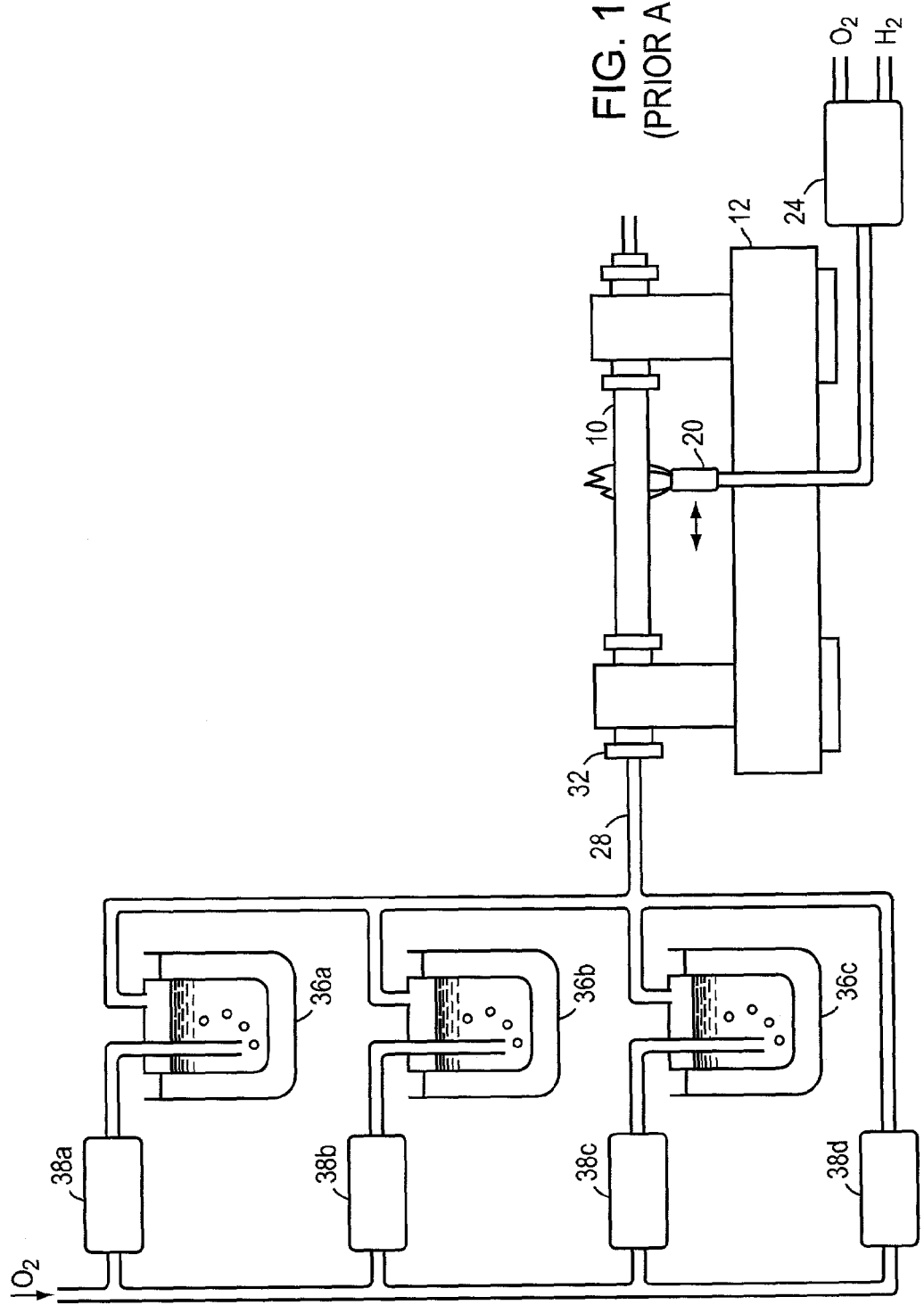
FIG. 1A is a schematic view of an arrangement for producing an optical fiber preform according to the MCVD process.
Figure 1B:
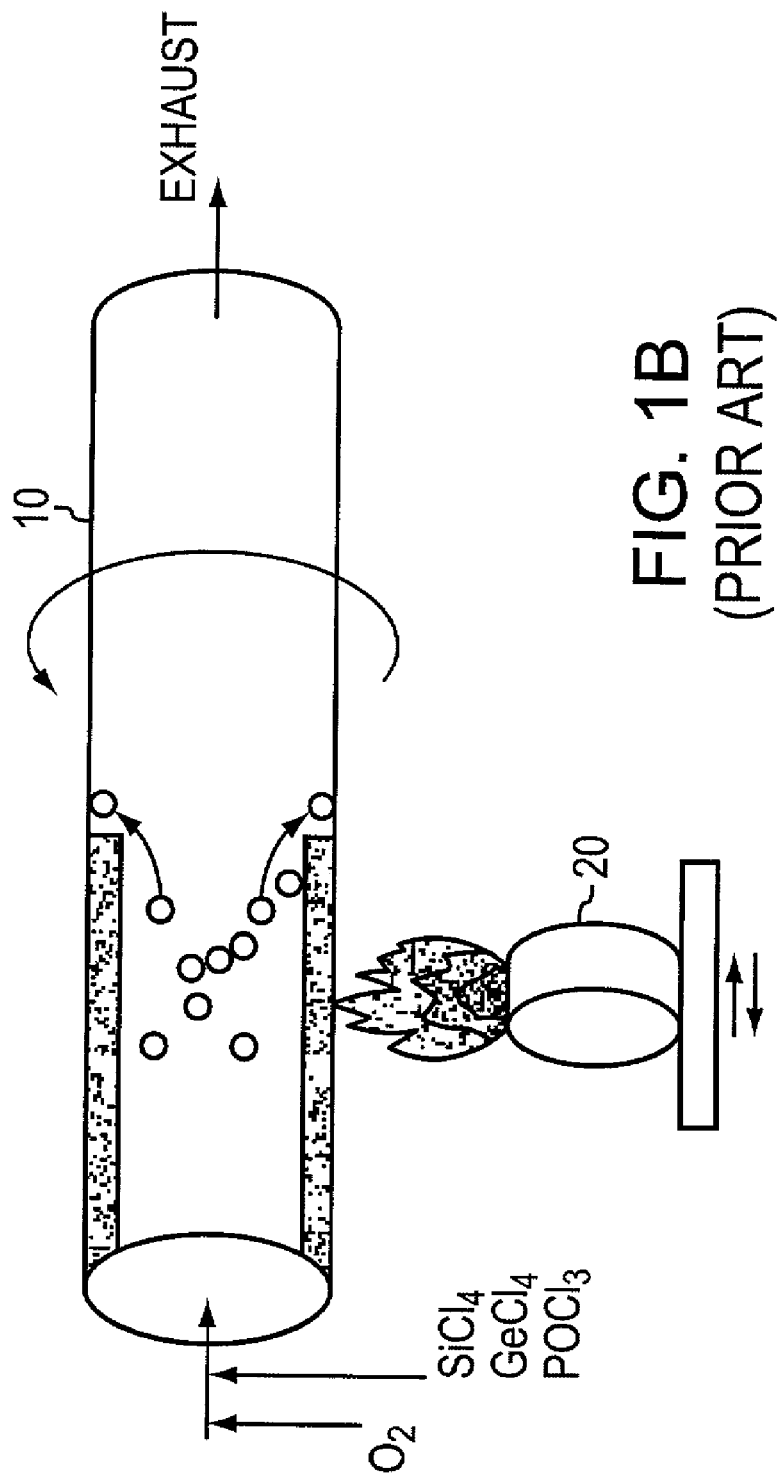
FIG. 1B is an schematic view of soot being deposited within a glass reaction tube according to the MCVD process.
Figure 2A:
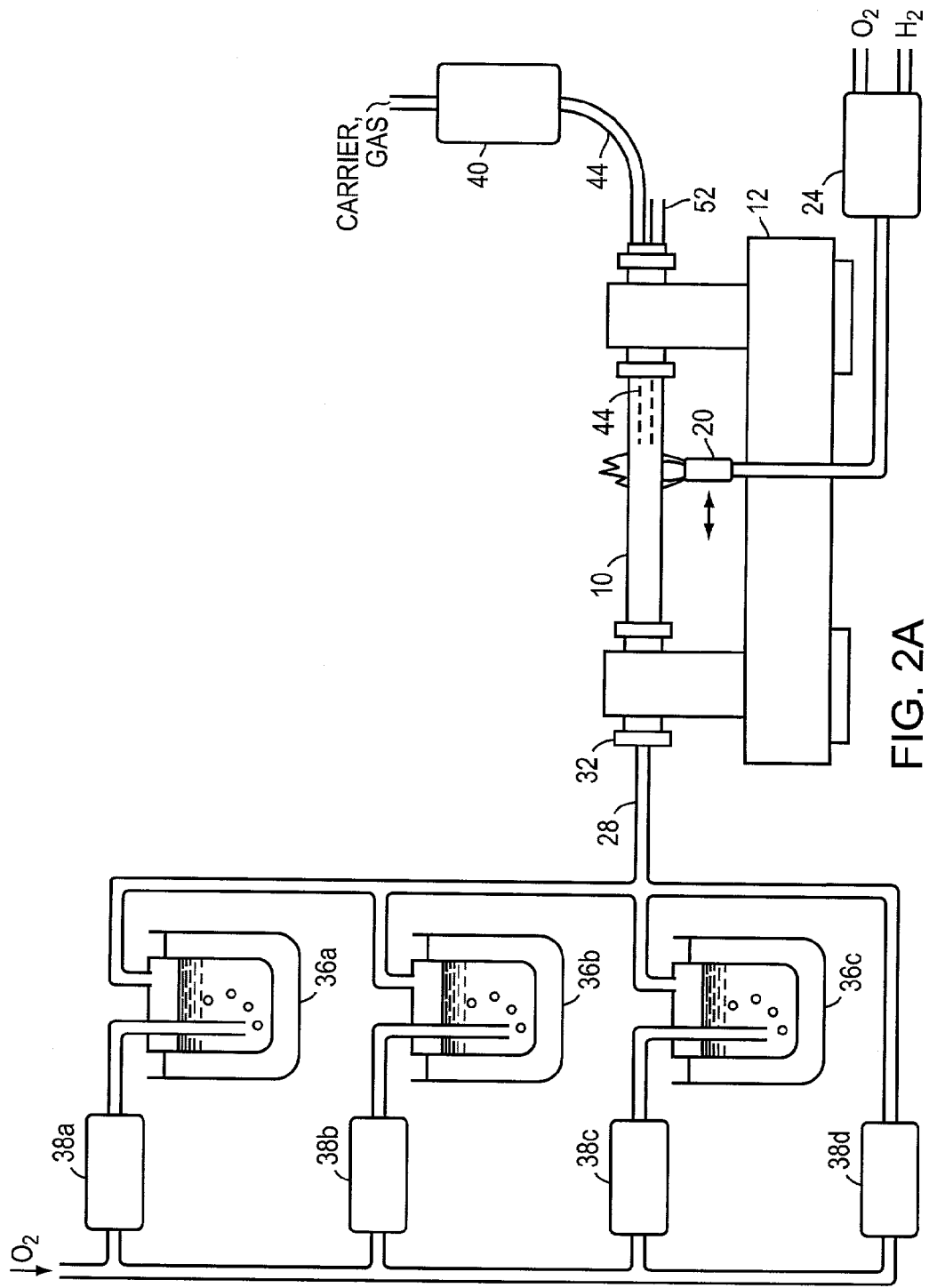
FIG. 2 is a schematic view of an arrangement for producing an optical fiber preform in accordance with the principles of the present invention.
FIG. 2B is a schematic view of soot being deposited within a glass reaction tube according to the principles of the present invention.
Figure 2B:
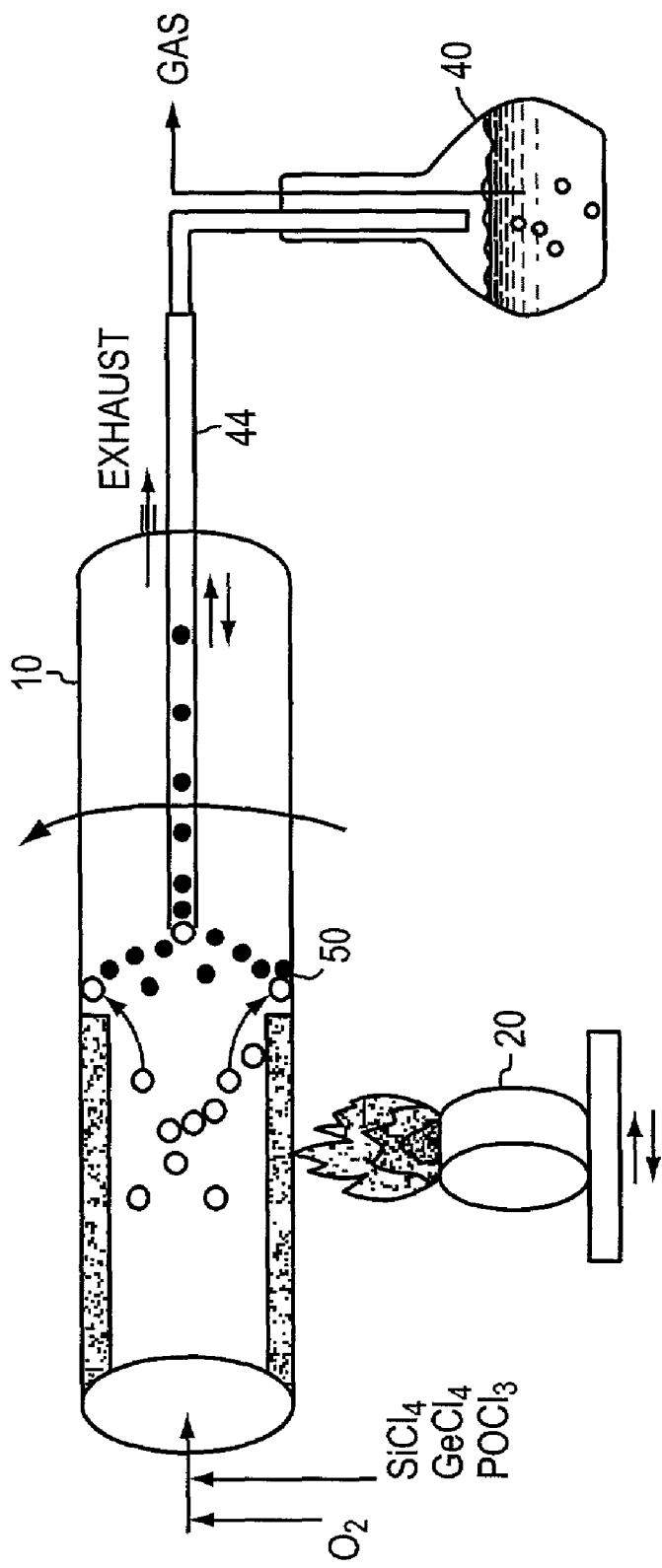

In more detail, with reference to FIGS. 2A and 2B, the invention may be implemented using a glass tube 10 that is rotated at a substantially constant rate by a lathe 12. Generally, the vapor-phase reactants previously mentioned are conducted into the glass tube 10 in the manner described with reference to FIG. 1A.

Additionally, aerosol droplets of the dopant reactants (such as, but not limited, to $ErCl_3$), provided by a nebulizer (or atomizer) 40, are conducted into the glass tube 10 through the opposite end, by means of an aerosol conduit 44. Alternatively, the aerosol conduit 44 can enter into the glass tube 10 through the same end as the gas feed pipe 28. The heat source 20 initiates a reaction within the glass tube 10. The reaction results in soot (i.e., solid-phase particles) being deposited in region 50, as shown in FIG. 2B, proximate to (and generally ahead of) the heat source 20. The by-products of the reaction and any unconsumed reactants are exhausted out of the glass tube 10 through exhaust tube 52.

The soot particles from the reaction of the vapor-phase and aerosol-form reactants are deposited, in solid form, in the region 50. The heat source 20, at a temperature substantially near 1600° C.–1900° C., travels longitudinally (i.e., axially) the length of the glass tube 10, sintering the solid form soot and dopant particles and thereby generating a doped glass preform without removing, soaking, or reheating.

Thus, the aerosol conduit 44 is controlled such that it moves longitudinally as indicated by the arrows so the aerosol-form dopant solution is continuously introduced in the reaction region 30—i.e., just ahead of the heat source 20. It is not, however, strictly necessary to introduce the aerosol components ahead of the heat source 20, so long as introduction occurs proximate to the heating zone. For example, the aerosol component(s) can be introduced within the heating zone or even just behind it. Thus, whereas the gas feed pipe 28, which introduces the vapor-phase reactants is typically stationary, the aerosol conduit 44 moves to maintain proximate introduction of the aerosol-form reactants into the heating zone.

In one embodiment, the nebulizer 40 includes a dopant solution, for example a solution of an Er compound such as $ErCl_3$. A compressed carrier gas, such as $O_2$ or $N_2$, is conducted into the nebulizer 40, thereby causing formation of an aerosol mist. The aerosol mist contains droplets that are sufficiently small to ensure even radial dispersion with the glass tube 10, efficient reaction with the vapor-phase reactants, and effective integration during sintering.

Having shown the preferred embodiments, one skilled in the art will realize that many variations are possible within the scope and spirit of the claimed invention. It is therefore the intention to limit the invention only by the scope of the claims.

What is claimed is:

1. A hybrid method of producing a structure capable of being drawn into an optical fiber, the method comprising the steps of:
   a. providing a glass tube having an interior region;
   b. conducting vapor-phase reactants into the interior region;
   c. injecting reactants in aerosol form into the interior region of the tube at varying longitudinal positions; and
   d. exposing the tube to heat so as to cause reaction among the vapor-phase and aerosol reactants to form products, the products depositing in solid form so as to accrete annularly within the tube.

2. The method of claim 1 wherein:
   a. the tube has an exterior and a length;
   b. the step of exposing the tube to heat comprises subjecting the exterior of the tube to a flame moving along the length the tube, the flame having an envelope defining, within the tube, a reaction region moving with the flame; and
   c. the aerosol reactants are continuously injected into the tube proximate to the moving reaction region.

3. The method of claim 2 wherein the products deposit as soot along the interior the tube, the soot being sintered by the heat, the products being continually deposited on an unsintered soot region.

4. The method of claim 1, wherein the aerosol reactants comprise at least one lasing-material precursor.

5. The method of claim 4, wherein the lasing material comprises an Er compound.

6. The method of claim 1, wherein the step of exposing the tube to heat comprises exposing the tube to a movable, localized region of heat substantially 1600° C.–1900° C.

7. The method of claim 1, wherein the vapor-phase reactant and aerosol-form reactant are introduced through opposite ends of the glass tube.

8. An apparatus for producing a structure capable of being drawn into an optical fiber, the apparatus comprising:

a lathe for rotating a reaction tube having an axial length, first and second ends, and an interior region;

a first source of a vapor-phase reactant;

a vapor-phase reactant conduit for entering the reaction tube through an end thereof, the vapor-phase reactant conduit facilitating the introduction into the reaction tube of vapor-phase reactants from the first source;

a second source of an aerosol-form reactant;

an aerosol-form reactant conduit for entering the reaction tube through an end thereof, the aerosol-form reactant conduit being axially movable within the interior of the reaction tube and facilitating the introduction of aerosol-form reactants from the second source into the interior of the reaction tube; and a heat source movable in cooperation with the aerosol-form reactants conduit along the axial length of the reaction tube, the heat source facilitating a reaction among the aerosol-form and vapor-phase reactants to form products, the products depositing in solid form so as to accrete annularly within the interior of the reaction tube.

9. The system of claim 8, wherein the heat source produces a flame having an envelope, the envelope defining a reaction region within the reaction tube that moves with the flame, the aerosol-form reactants being continuously injected into the reaction tube proximate to the moving reaction region.

10. The system of claim 8, wherein the aerosol-form reactants comprise at least one lasing-material precursor.

11. The system of claim 10, wherein the lasing material precursor comprises an Er compound.

12. The system of claim 9, wherein the reaction region has a temperature of substantially 1600° C.–1900° C.

13. The system of claim 8, wherein the vapor-phase reactant conduit and aerosol-form reactant conduit enter through the same end of the reaction tube, and the aerosol-form reactant reaction conduit moves to maintain proximate introduction of the aerosol-form reactants to the heat source.

14. The system of claim 8, wherein the vapor-phase reactant conduit and aerosol-form reactant conduit enter through opposite ends of the reaction tube, and the aerosol-form reactants conduit moves to maintain proximate introduction of the aerosol-form reactants to the heat source.

* * * * *